United States Patent [19]

Mialet

[11] 4,332,565
[45] Jun. 1, 1982

[54] DISPLAY SYSTEM

[76] Inventor: Pierre F. Mialet, 56, rue Vieille du Temple, 75003 Paris, France

[21] Appl. No.: 108,962

[22] Filed: Dec. 31, 1979

[30] Foreign Application Priority Data

Jan. 3, 1979 [FR] France ................ 79 00070

[51] Int. Cl.$^3$ .................. G09B 1/06; G09B 1/16; G09B 5/00; G09B 23/02
[52] U.S. Cl. .................... 434/118; 434/154; 434/189
[58] Field of Search ............ 35/21, 30; 283/1 A; 434/154, 276, 118, 188, 189

[56] References Cited

U.S. PATENT DOCUMENTS

| | | | |
|---|---|---|---|
| 1,959,040 | 5/1934 | Schilling | 273/153 R |
| 3,482,331 | 12/1969 | Gazale | 35/30 |
| 3,970,313 | 7/1976 | Montemayor | 273/243 |
| 4,201,386 | 5/1980 | Seale et al. | 273/236 |
| 4,273,542 | 6/1981 | Zellweger | 434/433 |

Primary Examiner—Anton O. Oechsle
Attorney, Agent, or Firm—Darby & Darby

[57] ABSTRACT

A display device comprising a plurality of adjacent hierarchical orders, and at least one hierarchichal display in each order. The number of hierarchichal orders is n. The number of hierarchical displays in each order is $2^{n-1}$. The displays in each order include (n−1) display segments when n> and one display segment when n=1. The hierarchichal displays within each order are arrayed symmetrically about a medial boundary line intersecting the orders. Means for representing selected indicia at each display segment are provided.

7 Claims, 15 Drawing Figures

| | | E |
|---|---|---|
| p\|q | | $\bar{A} \cup \bar{B}$ |
| p⇒q | si p    q | $\bar{A} \cup B$ |
| $\bar{p}$ | p | $\bar{A}$ |
| q⇒p | si q    p | $A \cup \bar{B}$ |
| $\bar{q}$ | q | $\bar{B}$ |
| ⇔ | p  q | $(A \cup B) \cap (\bar{A} \cup \bar{B})$ |
| p↓q | p  q | $\bar{A} \cap \bar{B}$ |
| pVq | p  q | $A \cup B$ |
| pwq | | $(A \cap B) \cup (\bar{A} \cap \bar{B})$ |
| q | q | B |
| q↑p | q  p | $\bar{A} \cap B$ |
| ·p | p | A |
| p↑q | p  q | $A \cap \bar{B}$ |
| p∧q | p  q | $A \cap B$ |
| | | ∅ |

DISPLAY SYSTEM

The present invention has for its object a display system which allows displaying groups of letters or symbols which are representatives of abstract concepts, said system being capable, in particular, of forming a teaching device which is of considerable interest for teachers of mathematics.

The system is constituted, on the one hand, by a table provided with spaces and, on the other hand, by an arrangement of display means which allow symbols to be placed in these spaces. The table includes 99 spaces distributed over five columns, the first column including one space, the second column including two spaces, the third column including 4 groups of 2 spaces, the fourth column including 8 groups of 3 spaces and the fifth column including 16 groups of 4 spaces.

The means which allow symbols to be caused to appear in the spaces may be small plates, cubes or tubes.

The table forms a dichotomically selecting tree playing two parts and it is possible to consider it as a genealogical tree of ancestors illustrating both paternal and maternal functions.

By way of a non-limiting example and with a view to furthering an understanding of the invention, there is illustrated in the accompanying drawings.

The display system includes a table on which is drawn what is termed a dichotomical tree which shows 99 spaces distributed symmetrically to either side of a medial horizontal axis.

Figure 1:
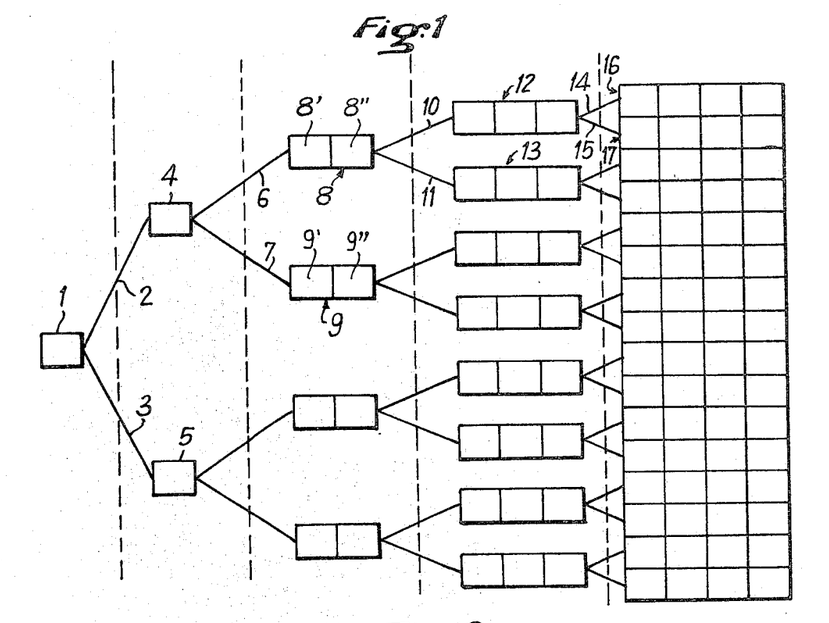
FIG. 1: a view of the table on which a selection tree is drawn.
Figure 2:
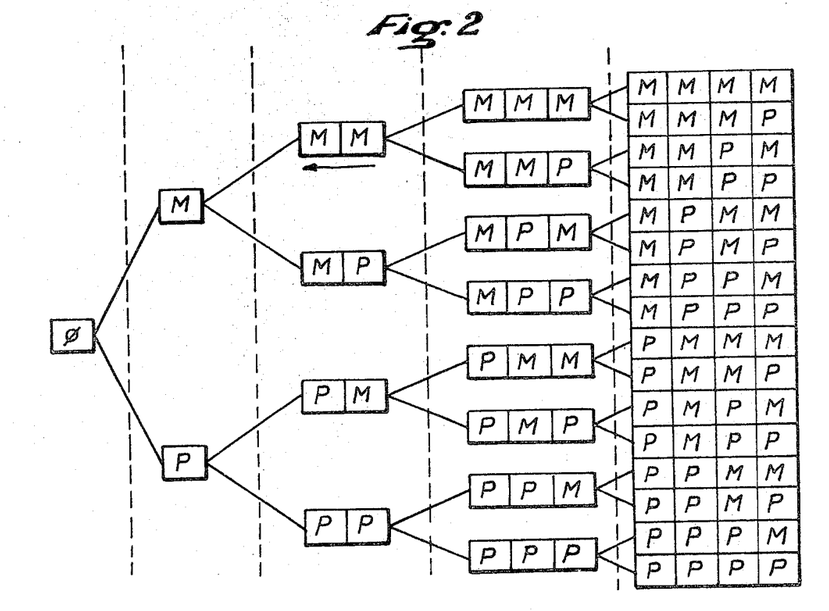
FIG. 2: a view of the table of FIG. 1 showing the means for indicating paternal and maternal relationship.

Said table may be blank, such as the one illustrated in FIG. 1, or filled in, such as the one illustrated in FIG. 2.

It includes 5 vertical columns and is divided into two equal and symmetrical parts which are separated by a horizontal line. In order that the table may be read more easily, the two parts are preferably made of different colors.

Said tree is termed a dichotomical tree because it is divided into two parts which lie symmetrically with respect to each other from one column to the next one; thus the first column includes a space 1 located on a medial horizontal line dividing the table into two symmetrical parts; from compartment 1 there start two symmetrical connections 2 and 3, leading to two symmetrical spaces 4 and 5. From the space 4, there start two symmetrical spaces 8 and 9; these groups are made up of two spaces such as 8', 8", 9', 9" adjacent each other. Similarly, from the group 8, there start two symmetrical connections 10 and 11 which lead to two groups of three symmetrical spaces 12 and 13, each of the groups 12 and 13 being constituted by three spaces adjacent one another. Also similarly, from the group 12, there start two symmetrical connections 14 and 15 leading to two groups 16 and 17, each of the groups 16 and 17 being constituted by 4 spaces, of the same size as space 4, which are adjacent one another.

There is thus obtained a table which is divided into five columns, each column being divided into two symmetrical parts, the first column comprising one space placed in the center of said column, the second column comprising two spaces symmetrical with reference to the medial line, the third column comprising four groups of two spaces symmetrical of each other in each part of the column, and two by two with reference to the medial line; the fourth column comprising eight groups of three spaces symmetrical of one another and two by two with reference to the medial line; the fifth column comprising sixteen groups of four spaces symmetrical with reference to one another and two by two, four by four, and eight by eight.

The table illustrated on FIG. 1 may be filled up so as to constitute an ancestor's genealogical tree illustrating the two functions "Mother" and "Father", so as to be more representative.

Said table may be filled up either by the person using it, who builds up his table himself by means of detachable plates which he sets down in the spaces or else by printing the table.

The advantage of the setting down of detachable plates consists in that the teacher can, by laying them in position in front of his pupils, explain how the table is executed.

Figure 13:
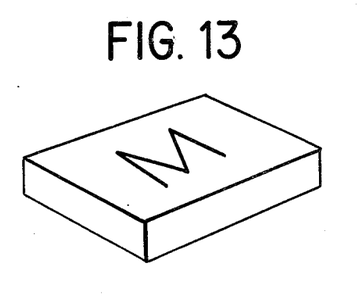
FIG. 13: a plate bearing an indicia.

The functions "Mother" and "Father" are designated by the letters M and P which appear either on the small detachable plates (49 of each kind) or which are printed in the spaces of the table of FIG. 1. A typical plate is displayed in FIG. 13.

If the person using the table wishes to provide himself for the completion of the table, it is of advantage for the spaces to be formed as hollowed parts of the table surface, the 49 small plates carrying the letter M and the 49 small plates carrying the letter P being fitted within these hollowed parts. Furthermore the system includes a small plate carrying the symbol φ of the null set and five small rectangular plates carrying the following data: EGO, PARENTS, GRAND-PARENTS, GREAT GRAND-PARENTS. These five small rectangular plates should have preferably the same width, but with different lengths, and the surface of the table includes in each column a recess having the length of the corresponding small plate, and only one, so that no mistake is possible.

In the first column, the small plate EGO is set; in the second, the small plate PARENTS; in the third one, the small plate GRANDPARENTS; in the fourth one, the small plate GREAT GRANDPARENTS; in the fifth one, the small plate GREAT GREAT GRANDPARENTS.

The small plate carrying the symbol of the null set is placed in the single case of the first column.

In the second, "PARENTS" column, the upper case carries the marking M and the lower space the marking P which indicate the Mother and the Father.

The third column is that of the grandparents, maternal grandparents for the upper part of the table, paternal grand-parents for the lower part. As regards the maternal grandparents, the first space in each group of two spaces carries the marking M, then the second space of the lower group carries the marking P. This applies similarly to the paternal grandparents: each first space receives a marking identical with that of the "PARENTS" column, namely the marking P, the second space of the upper group receiving the letter M and the second space of the lower group the letter P.

It is thus apparent that, starting from the upper end downwards, one finds the Mother of the Mother (Maternal Grandmother), then the Father of the Mother (Maternal Grandfather), then the Mother of the Father (Paternal Grandfather) and lastly the Father of the Father (Paternal Grandfather).

In order to make the reading of the lineage function easier—which reading is to be performed from the right to the left—it is of advantage to resort to arrows, as illustrated by way of example in the grandparents column of FIG. 2.

The fourth column is that of the great grandparents; it is apparent that one finds when reading downwards: the Mother of the Mother of the Mother (Mother of the maternal Grandmother), then the Father of the Mother of the Mother (Father of the Maternal Grand-mother) and so on.

The fifth column is that of the great great grandparents.

Thus one sees that, starting from the upper end downwards, one finds the Mother of the Mother of the Mother of the Mother (the maternal grandmother of the maternal grandmother), then the Father of the Mother of the Mother of the Mother (the Maternal Grandfather of the Maternal Grandmother) and so on.

As already mentioned previously, the table can include either printed spaces carrying the spaces and the M and P markings arranged according to the above mentioned sequence, or empty spaces in which the person using the table can display the plates M and P in the manner disclosed hereinabove.

EXAMPLE 1. BINARY CALCULATION

The display system includes, in addition to what has been described hereinabove, 49 plates carrying the digit 1 and 49 plates carrying the digit 0.

Figure 3:
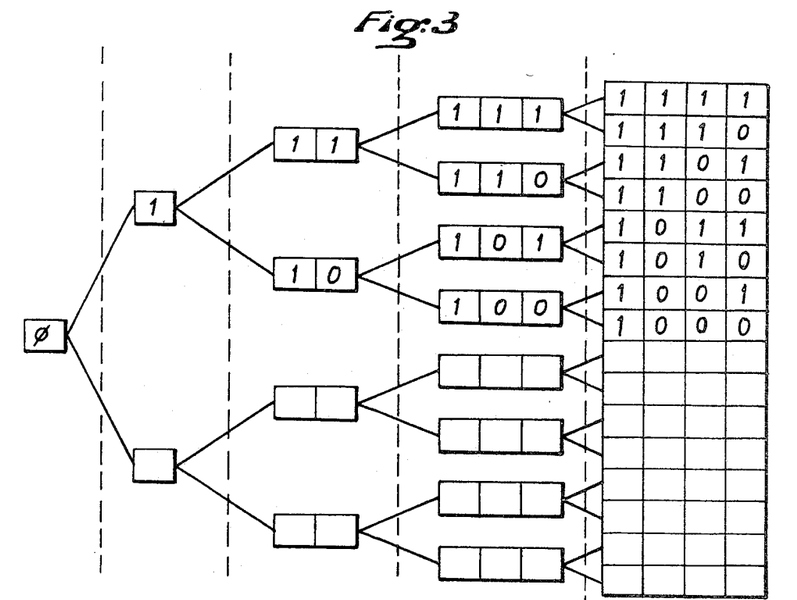
FIG. 3: a first example of a display as obtained by means of movable elements carrying marks 0 and 1.

By covering each letter M with the plate 1 and each letter P with the plate 0 in the sole upper part (portion of the table corresponding to the function Mother or genealogical tree of the Mother), there is obtained what is illustrated in FIG. 3, the plates M and P of the lower portion being omitted.

Said arrangement visualizes the binary tree when the reading is performed from the left towards the right and upwards in each column.

Figure 4:
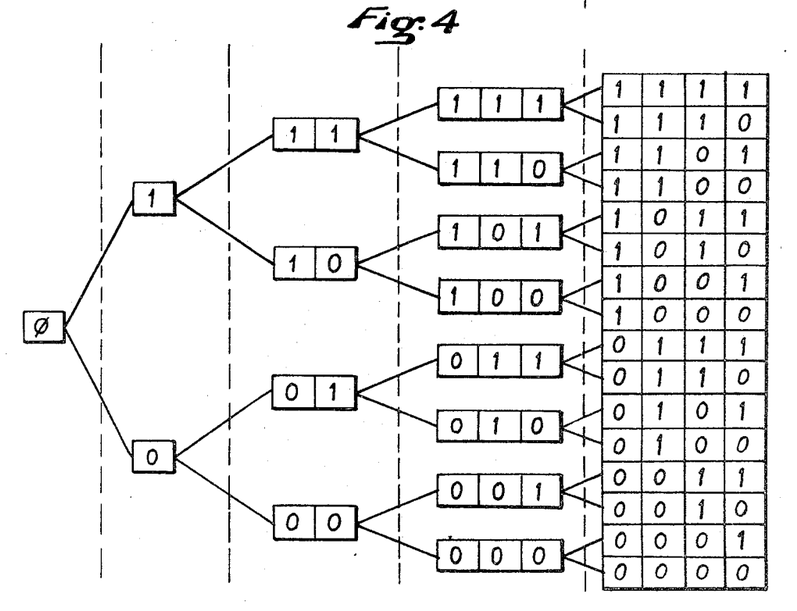
FIG. 4: a modification of the arrangement illustrated in FIG. 3.

In contradistinction, if in the table of FIG. 2 each letter M is covered by the digit 1 and each letter P by the digit 0, but now on both parts of the table, there is obtained what is illustrated in FIG. 4.

Said arrangement visualizes:

in the GRANDPARENTS' column, the sequence of the binary electronic meters showing two digits, the 0 illustrating extinction of the tube and the 1, the illumination of the tube;

in the GREAT GRANDPARENTS' column, the same thing, but with binary electronic meters showing three digits;

in the GREAT GREAT GRANDPARENTS' column, the same thing but with binary electronic meters showing four digits.

EXAMPLE II—PASCAL'S TRIANGLE

According to a modified embodiment, the plates carrying the digit 0 show a background of a dark color (grey or black), whereas the plates carrying the digit 1 show a background of a red or gold color, whereby the plates 0 define an extinguished tube and the plates 1 an illuminated tube.

The table being arranged as illustrated in FIG. 4 allows visualizing Pascal's triangle.

In fact, if one examines in sequence the columns by computing the illuminated or extinguished tubes, the following is noted:

Column "PARENTS" (meter with 1 digit)
    contact with 1 illuminated tube    1
    contact with 0 illuminated tube    1
column "GRANDPARENTS" (meter with 2 digits)
    contact with 2 illuminated tubes    1
    contact with 1 illuminated tube    2
    contact with 0 illuminated tube    1
Column "GREAT GRANDPARENTS" (meter with 3 digits)
    contact with 3 illuminated tubes    1
    contact with 2 illuminated tubes    3
    contact with 1 illuminated tube    3
    contact with 0 illuminated tube  10 1
Column "GREAT GREAT GRANDPARENTS" (meter with 4 digits)
    contact with 4 illuminated tubes    1
    contact with 3 illuminated tybes  10 4
    contact with 2 illuminated tubes    6
    contact with 1 illuminated tube    4
    contact with 0 illuminated tube    1

EXAMPLE III—NOTEWORTHY IDENTITIES

According to a modified embodiment, the display system includes 49 plates carrying the letter x and 49 plates carrying the letter y.

Figures 5, 6:
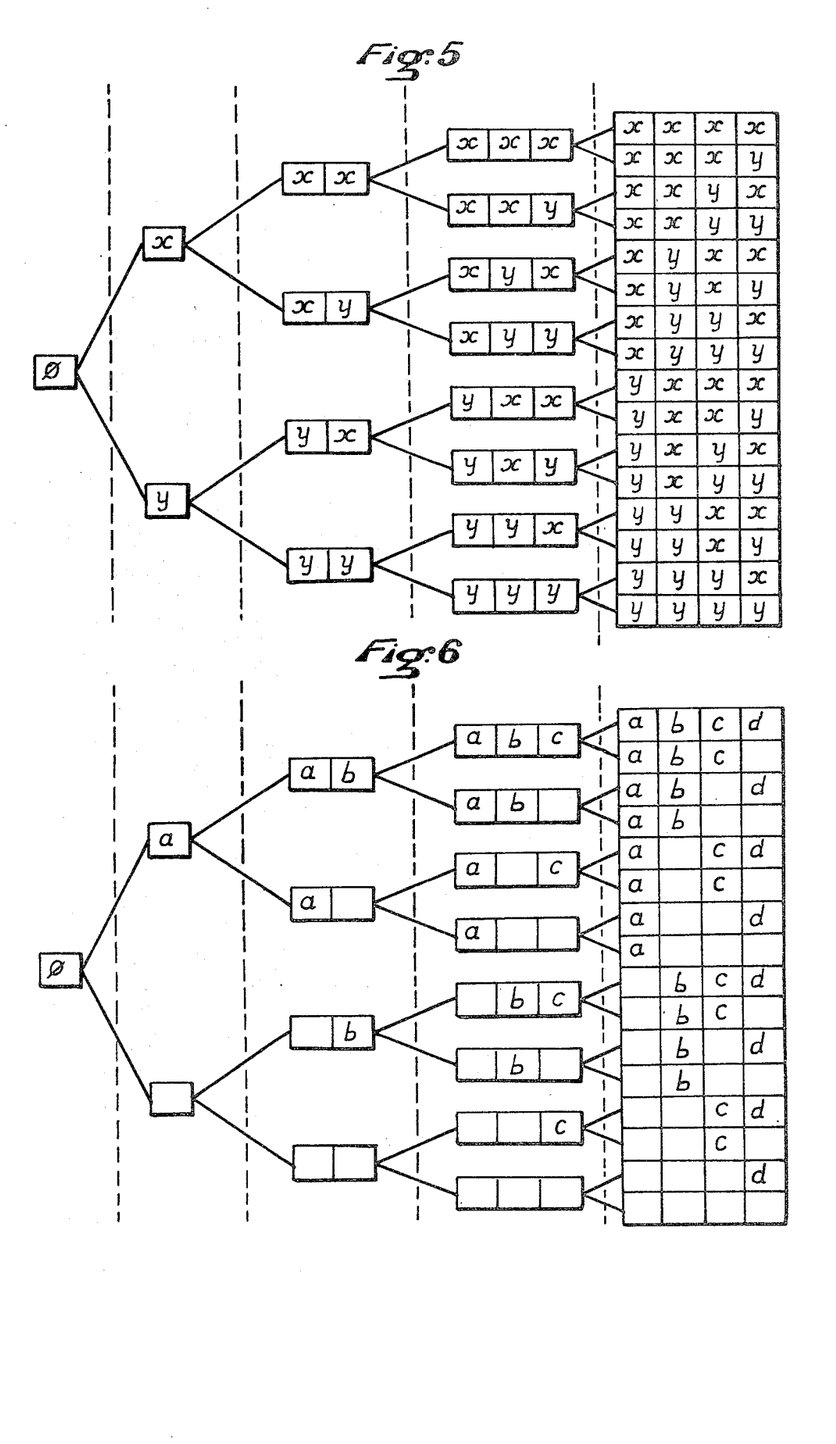
FIG. 5: a third example of a display, provided by means of movable elements carrying marks x and y.
FIG. 6: a fourth embodiment of a display, provided by means of movable elements carrying the marks a, b, c, d.

By setting the plates x over the spaces M and the plates y over the spaces P, the arrangement illustrated in FIG. 5 is obtained.

By examining the "GRANDPARENTS" column, it is apparent that $(x+y)^2$ leads to $xx+xy+yx+yy$, that is $x^2 = 2xy + y^2$.

Similarly the GREAT GRANDPARENTS column allows displaying in a very clear and readily understandable manner $(x+y)^3 = x^3 + 3x^2y + 3xy^2 + y^3$, whereas the GREAT GREAT GRANDPARENTS column allows visualizing the noteworthy identity $(x+y)^4 = x^4 + 4x^3y + 6x^2y^2 + 4xy^3 + y^4$.

EXAMPLE IV—THEORY OF SETS

According to a further modified embodiment, the pack includes, on the one hand, 15 plates carrying the letter "a", 14 plates carrying the letter "b"; 12 plates carrying the letter "c", eight plates carring the letter "d"; on the other hand, 15 plates carrying the reference "ā", which reads "a-dash" or "complementary of a", and which is constituted by the letter "a" over which is laid the symbol "minus" and similarly, 14 plates carrying the marking "b̄", 12 plates carrying the marking "c̄", and 8 plates carrying the marking "d̄".

These movable elements, associated with the table of FIG. 1 or 2 allow illustrating a given number of operations dependent on the theory of sets.

Set of the parts of a set.

The arrangement illustrated in FIG. 6 is obtained by laying the plates "a" on the letter M of each first space, the plates "b" on the letter M of each second space, the plates "c" on the letter M of each third space, and the plates "d" on the letter M of each fourth space.

Upon examination of said FIG. 6, it is apparent that it visualizes the set of the parts of a set.

In fact:

the column EGO includes the null set $\{\phi\}$ the column PARENTS includes the null set and the singleton a, that is when there is only a single element, the set of sub-sets is $E = \{\phi, a\}$ the column GRANDPARENTS shows that when there are two elements a and b, the set of sub-sets is $\{\phi, a, b, ab\}$.

The column GREAT GRANDPARENTS shows that when one is provided with three elements a, b, c, the set of sub-sets is $\{\phi, a, b, d, ab, ac, bc, abc\}$.

Figure 7:
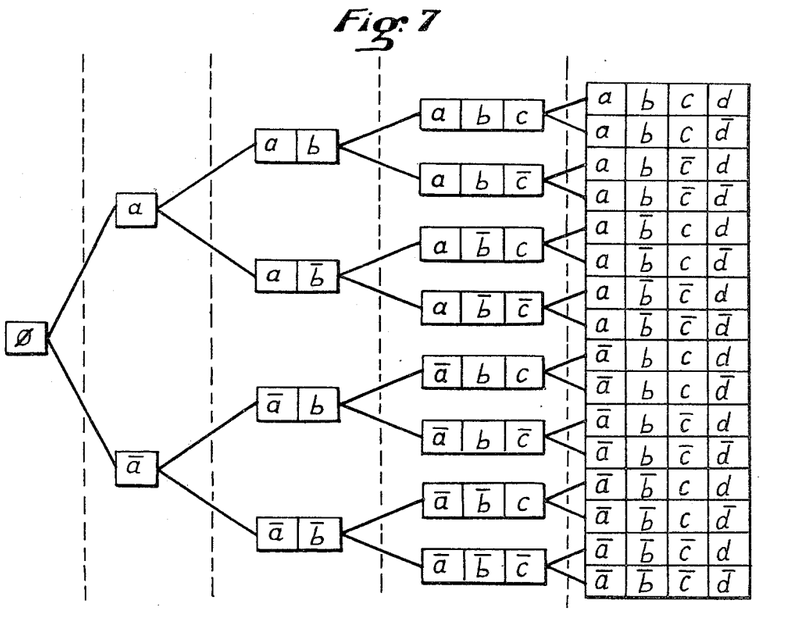
FIG. 7: a modification of the arrangement obtained in FIG. 8, with complementary movable elements.

The column GREAT GREAT GRANDPARENTS shows that when there are provided four elements a, b, c, d, the set of sub-sets is $\{\phi a, b, c, d, ab, ac, ad, bc, bd, cd, abd, acd, bcd, abcd\}$ By locating the plates ā, b̄, c̄, d̄, as illustrated in FIG. 7, it is possible ot obtain the display of intersection operations in sets designated by their names, which are respectively a, b, c, d.

FIG. 7 is obtained by laying the complementary elements ā, b̄, c̄, d̄, over the letters P in the same manner as that of the laying of the letters a, b, c, d, on the letters M.

Figure 8:
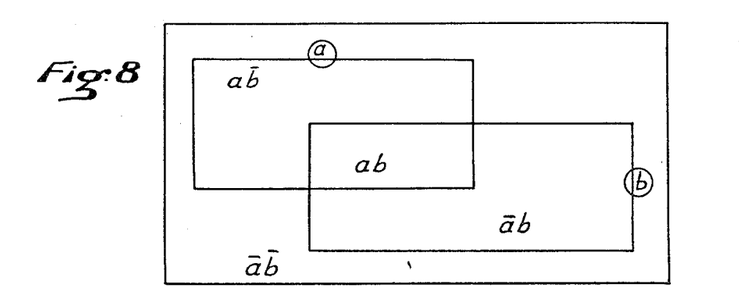
FIG. 8: a view of a card showing the diagram of the intersections of two sets.
Figure 9:
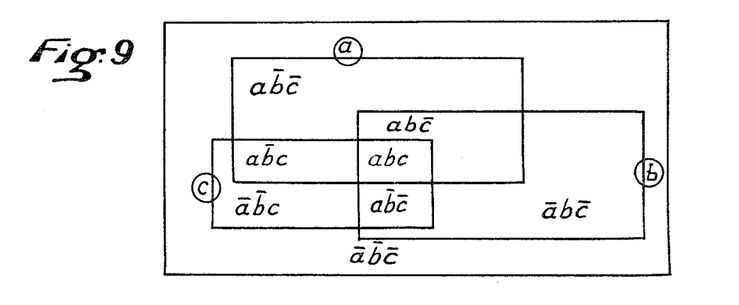
FIG. 9: a view of a card showing the diagram of the intersections of three sets.

In this case, it is possible to make use of two complementary cards such as those illustrated in FIG. 8 and 9 in order to make the reading of the display system easier.

EXAMPLE V—THEORY OF GROUPS AND ALGEBRA

Preferably, the arrangement includes 15 plates carrying each a symbol a, b, c, d, and ā, b̄, c̄, d̄, so that it is possible to modify the alphabetical sequence of the letters and of their complements, which allows visualizing the theory of the GALOIS groups.

Figure 10:
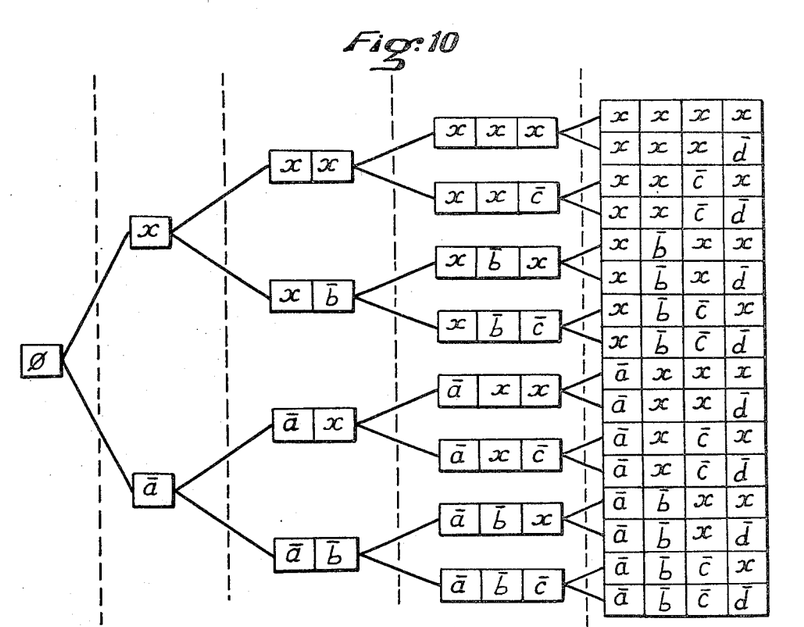
FIG. 10: a sixth example as obtained through combination of the elements of FIGS. 5, 6 and 7.

By way of example, if the letters M are covered by the plate x and the letters P by the plate ā in the first spaces, b̄ for the second spaces, c̄ for the third spaces and d̄ for the fourth spaces, the arrangement illustrated in FIG. 10 is obtained.

Assuming that ā and b̄ may be read $-a$ and $-b$, the GRANDPARENTS column shows the result of the multiplication of factors:

$$(x-a)(x-b) = x^2 - (a+b)x + ab = 0$$

and the GREAT GRANDFATHERS column:

$$(x-a)(x-b)(x-c) = x^3 - (a+b+c)x^2 + (ab+ac+bc)x - abc = 0$$

EXAMPLE VI—GEOMETRY

It is also possible to display various geometrical data by means of this system.

Thus, referring to FIG. 6, it is apparent that the GRANDPARENTS' column illustrates, reading from the upper end downwards: the segment ab, the two points a and b and the null set; the GREAT GRANDPARENTS' column illustrates the triangle 3; as a matter of fact, there appear: the triangle abc, the sides ab, ac and bc, the apices a, b and c, and the null set; the GREAT GREAT GRANDPARENTS' column illustrates the tetrahedron abcd, with the triangular surfaces abc, abd, acd and bcd, the sides ab, ac, ad, bc, bd and cd and the apices a, b, c, d.

Furthermore, one of the main advantages of said arrangement consists in that it shows, in a concrete manner, that there is an isomorphism between the set of the parts of a set, geometrical figures, Pascal's triangle and the theory of the probability of two possibilities (heads or tails).

EXAMPLE VII—CONNECTORS OF LOGIC

Figure 11:
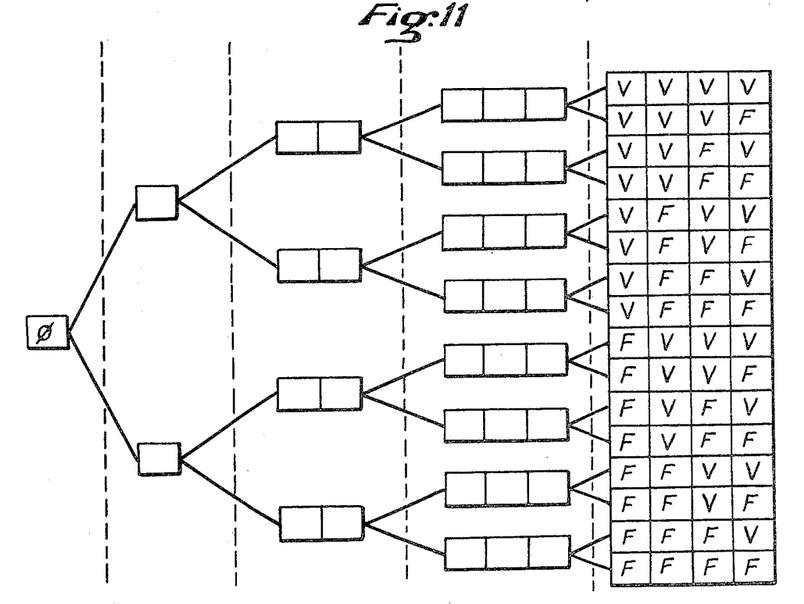
FIG. 11: a seventh example, as obtained by movable elements carrying the marks V and F.

According to a further modified embodiment, the arrangement includes 32 plates carrying the letter V and 32 plates carrying the letter F. By laying in the GREAT GREAT GRANDPARENTS' column the plates V over the letters M and the plate F over the letters P, the table illustrated in FIG. 11 is obtained (the letters M and P in the other columns having been omitted for sake of clarity of the figure).

The letter V meaning "true" and the letter F meaning "wrong", the sixteen lines carrying four letters (V or F) thus obtained form the sixteen resultants of the tables of truths of logic connectors, when read horizontally (whereas they are frequently reproduced in columns). The two basic propositions "p" (FFVV) and "q" (FVFV) appear respectively on the 13th and the 11th lines whereas their negatives "p̄" (VVFF) and "q̄" (VFVF) appear in the 4th and 6th lines.

Figure 12:
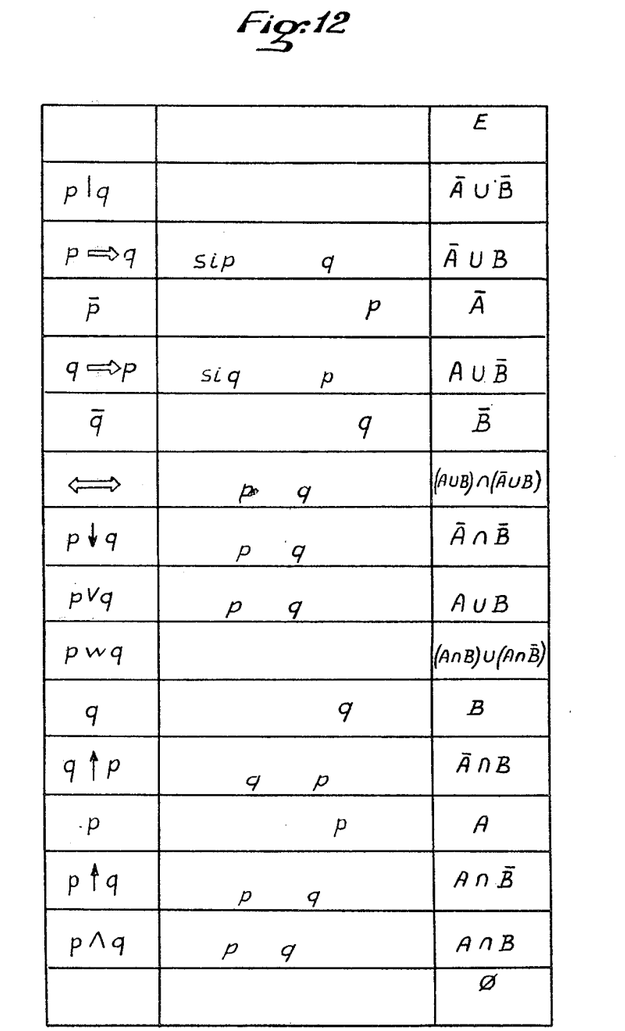
FIG. 12: a view of a card carrying the list of the logic connectors.

The pack may advantageously include an auxiliary detachable card, such as that illustrated in FIG. 12, which is intended to be laid adjacent the GREAT GREAT GRANDPARENTS' column, thus arranged in order to further the reading.

This card, illustrated in FIG. 12, includes a central column, which forms the list of the possible combinations of the two propositions p and q and of their negatives p̄ and q̄; it can include advantageously a column wherein said combinations are recorded with conventional symbols; but it can include also the mathematical script writing of the different intersection and union operations of the two sets A and B (and of their complements Ā and B̄), the set A corresponding to the proposition p and the set B to the proposition q.

The comparison between the GREAT GREAT GRANDFATHERS' columns on FIG. 2, 6 and 11 shows in a clear and concrete manner the isomorphism between the parental relationship (which corresponds to surnames) and the tables of truths of logic connectors and the set of the parts of a set of four elements a, b, c, d.

A being the part of the four element set (abcd) which corresponds with the proposition "p" and B the part of the same set which corresponds with the proposition "q".

$$A = \{-, -, c, d\}$$

$$B = \{-, b, -, d\}$$

and it is apparent that $A \cap B = \{d\}$ which is equivalent to the "conjunction of p and of q" in the logic (p q).

Similarly, $A \cup B = \{b, c, d\}$ which is equivalent to the "inclusive disjunction of p and q" in the logic (p ⋂ q).

By causing a correspondence, as mentioned above, between $\bar{A}$ and $\bar{p}$ on the one hand, and $\bar{B}$ and $\bar{q}$ on the other hand, one visualizes other correspondences between the theory of sets and the algebra of propositions.

The systems allows also visualizing certain aspects of MORGAN's Law $\overline{A \cap B} = \bar{A} \cup \bar{B}$ and also $\overline{A \cup B} = \bar{A} \cap \bar{B}$; it allows also the pupils to be made familiar with the basic principles of Boole's algebra, which is used in computers.

According to a modification, the pack includes 49 plates carrying the letter V and 49 plates carrying the letter F; by laying these plates in all the columns and in reading in a vertical direction the GRANDPARENTS' and GREAT GRANDPARENTS' columns, it is possible to read combinations of the propositions p and q.

It is quite obvious that the invention is not limited to the case where plates are available for covering or filling the spaces carrying the letters M or P, since it is possible to provide an equivalent pack through electric or electronic means.

For this purpose, the spaces are replaced by luminous sights and the groups of plates x, y, a, $\bar{a}$, b, $\bar{b}$, and the like are replaced by a keyboard which allows the same symbols to be made to appear at the suitable locations.

Figure 14:
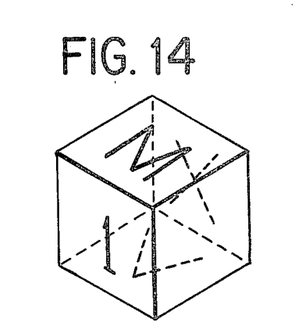
FIG. 14: a cube bearing indicia.

According to another modified embodiment, it is possible to resort no longer to 49 plates, but to cubes carrying the desired indications. See FIG. 14. In particular, it is possible to use four groups of 49 cubes, the cubes of the first group carrying the markings M,1,x,V; the cubes of the second group carrying the markings P,0,y,F; the cubes of the third group carrying the markings a,b,c,d, and those of the fourth group carrying the markings $\bar{a}, \bar{b}, \bar{c}, \bar{d}$.

Preferably, the cubes of the first and third groups are of the same color and those of the second and fourth groups of another color, the red color symbolizing the "illuminated" condition and the black color the "extinguished" condition. It is also possible to resort, in addition to the colors, to those surfaces which carry no marking, so as to show on them the symbols "male" and "female" used for genetics.

It is also possible to make the symbol X—which is to illustrate the theory of groups—appear on the fifth side of the cubes of the third group.

According to a further modification, it is possible to use a televisor and a control case providing for the requested appearance of the desired symbols on the table.

Figure 15:
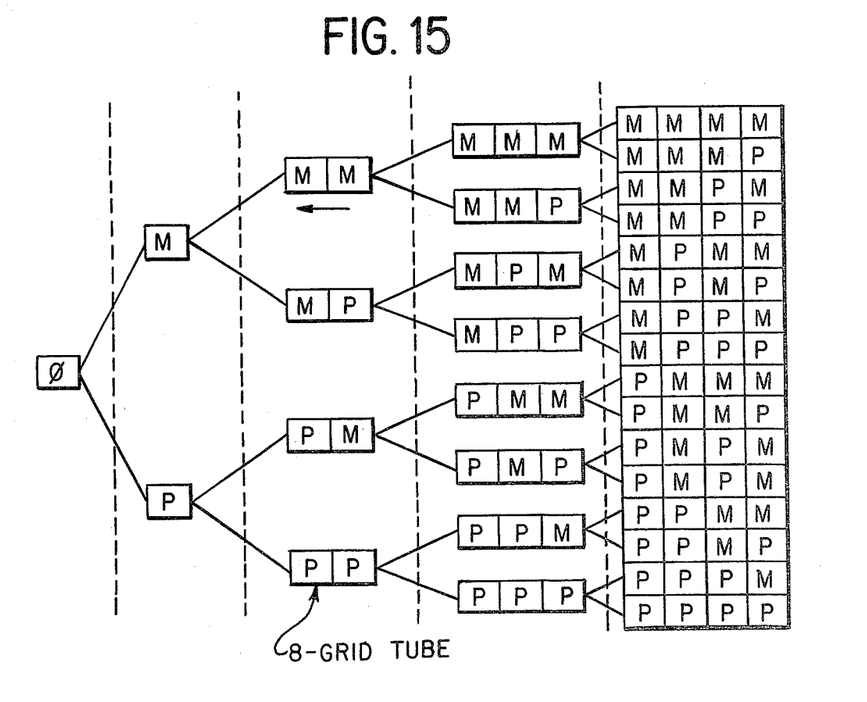
FIG. 15: a display provided with 8-grid tubes.

It is also possible to produce a luminous display table in which each space, except the first one, is provided with an 8-grid tube; there are thus available 98 tubes distributed into two groups, 49 tubes carrying the symbols $\underline{a}$, b, c, d, M, X, V, 1; 49 tubes carrying the symbols a, $\bar{b}$, $\bar{c}$, $\bar{d}$, P, Y, F, 0 and nine switches.

one for controlling the M or P switching
one for controlling the X or Y switching
one for controlling the 1 or 0 switching
one for controlling the V or F switching
one for controlling the a or $\bar{a}$ switching and so on. The 8-grid tubes are of conventional manufacture. See FIG. 15.

The system thus described allows consequently, through comparatively simple means, the display of abstract concepts and it allows one to bring out in a visually striking manner the isomorphism existing betwen different mathematic methods.

I claim:

1. Display device for the display of at least one indicia comprising a display surface provided with 99 display spaces distributed into five columns, the first column comprising one space, the second column comprising two spaces, located one above the other, the third column comprising 4 groups of two spaces, located above one another, the fourth column comprising 8 groups of 3 spaces located above one another, the fifth column comprising 16 groups of 4 spaces, said groups located one above another.

2. A display device according to claim 1, wherein the spaces or groups of spaces are connected, from one column to the next one, by paired connections arranged symmetrically in series, so that the space of the first column is at the center of the column on the medial axis of the system, the two spaces in the second column are located to either side of said medial axis and connected with the space in the first column, the four groups of two spaces in the third column are divided into two groups of two spaces on either side of the medial axis, each pair of group being connected with one of the spaces of the preceding column and the eight groups of three spaces in the fourth column are divided into four groups of three spaces on either side of the medial axis, each group being connected with one of the spaces of the preceding column and the sixteen groups of four spaces in the fifth column are divided into eight groups of four spaces on either side of the medial axis with each group connected with one of the spaces of the preceding column.

3. A display device as described in claim 2 further comprising means for displaying at least one representative indicia at one of said display spaces.

4. A display device according to claim 3, wherein the display means comprises at least one plate bearing at least one indicia selected from the group consisting of M, P, X, Y, V, F, a, b, c, d, $\bar{a}, \bar{b}, \bar{c}, \bar{d}$, 1 and 0.

5. A display device according to claim 3, wherein the display means (are constituted by) comprises at least one cube bearing indicia on at least one face thereof.

6. A display device according to claim 5 comprising four groups of 49 cubes, the cubes of the first group bearing the indicia M, 1, X, V; the cubes of the second group bearing the indicia, P, 0, Y, F; the cubes of the third group bearing the indicia $\bar{a}, \bar{b}, \bar{c}, \bar{d}$ and the cubes of the fourth group bearing the indicia a, b, c, d.

7. A display device according to claim 3 wherein the display means comprises 8-grid tubes distributed into two groups: a first group of 49 tubes capable of displaying the markings M, X, V, 1, a, b, c, d; and a second group group of 49 tubes capable of displaying the markings P, Y, F, 0, $\bar{a}, \bar{b}, \bar{c}, \bar{d}$.

* * * * *